United States Patent
Mehta et al.

(10) Patent No.: US 10,322,955 B2
(45) Date of Patent: Jun. 18, 2019

(54) WATER TREATMENT COMPOSITIONS AND METHODS OF USE

(71) Applicants: Rohm and Haas Company, Philadelphia, PA (US); Dow Global Technologies LLC, Midland, MI (US)

(72) Inventors: Somil Chandrakant Mehta, Mumbai (IN); Mahesh R. Sawant, Chester, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 213 days.

(21) Appl. No.: 15/506,062

(22) PCT Filed: Aug. 21, 2015

(86) PCT No.: PCT/US2015/046254
§ 371 (c)(1),
(2) Date: Feb. 23, 2017

(87) PCT Pub. No.: WO2016/032884
PCT Pub. Date: Mar. 3, 2016

(65) Prior Publication Data
US 2017/0253503 A1    Sep. 7, 2017

(30) Foreign Application Priority Data
Aug. 28, 2014 (IN) .......................... 2454/DEL/2014

(51) Int. Cl.
| | |
|---|---|
| *C02F 1/52* | (2006.01) |
| *C08L 39/00* | (2006.01) |
| *C08L 33/02* | (2006.01) |
| *C08L 33/14* | (2006.01) |
| *C02F 1/56* | (2006.01) |
| *C02F 103/00* | (2006.01) |

(52) U.S. Cl.
CPC .............. *C02F 1/5245* (2013.01); *C02F 1/56* (2013.01); *C08L 33/02* (2013.01); *C08L 33/14* (2013.01); *C08L 39/00* (2013.01); *C02F 2103/001* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 4,906,386 | A * | 3/1990 | Vasconcellos | ........ C02F 1/5236 209/5 |
| 5,637,229 | A * | 6/1997 | Rieber | ............... B01D 21/0012 210/723 |
| 5,663,263 | A | 9/1997 | Fischer et al. | |
| 6,180,023 | B1 * | 1/2001 | Amer | .................... C02F 1/5236 252/175 |
| 6,929,759 | B2 | 8/2005 | Fruh et al. | |
| 7,048,859 | B1 | 5/2006 | Moffett | |
| 2004/0171706 | A1 | 9/2004 | Inagaki et al. | |
| 2006/0142432 | A1 * | 6/2006 | Harrington | ......... C08F 293/005 524/13 |
| 2010/0213405 | A1 | 8/2010 | Wensloff | |

FOREIGN PATENT DOCUMENTS

WO       WO-0224580 A1 *   3/2002   ............ C02F 1/5236

OTHER PUBLICATIONS

Yukselen et al.; Formation and Breakage of Flocs Using Dual Polymers, Water Science & Technology, vol. 53, No. 7; pp. 217-223, 2006.
Fan et al; A Study of Dual Polymer Flocculation, Colloids and Surfaces A: Physicochemical and Engineering Aspects, vol. 162, pp. 141-148, 2000.
Park et al; Molecular Dynamics Simulation in Comparison of Efficacy of Cationic Organic Polyelectrolyte and Dual Polyelectrolyte Systems in Drinking Water Coagulation, Abstracts, 65th Southeast Reginal Meeting of the American Chemical Society, 2013.

* cited by examiner

*Primary Examiner* — Clare M Perrin

(57) ABSTRACT

Provided are compositions and methods that are useful for clarifying water, reducing turbidity of water, and removing salts from water. The compositions comprise (a) an anionic flocculant comprising at least one of an alkali swellable emulsion (ASE) or hydrophobically-modified alkali swellable emulsion (HASE), and (b) a cationic flocculant comprising (i) an aluminum-containing compound, and (ii) a copolymer of acrylamide and a cationic monomer comprising at least one of a diallyldialkylammonium quaternary compound, acrylamidoalkyltrialkylammonium quaternary compound, methacrylamidoalkyltrialkylammonium quaternary compound, and mixtures thereof.

8 Claims, No Drawings

WATER TREATMENT COMPOSITIONS AND METHODS OF USE

FIELD OF THE INVENTION

This invention relates generally to flocculants that are useful in water treatment compositions. The flocculants are a combination of cationic and anionic flocculants.

BACKGROUND

The removal of suspended matter from water is a concern for municipal water, water treatment plants, industrial treatment plants, environmental storm water, and recreational water. Flocculation is a well-known chemical process wherein suspended matter, often impurities, comes out of a suspension in the form of a floc or flake. The suspended matter typically causes water turbidity, which can be reduced through flocculation. It is important for the flocculants to rapidly form flocs that are large, adherent, and do not easily re-disperse if disturbed.

Many different types of flocculants have been disclosed in water treatment compositions. For example, U.S. Pat. No. 6,929,759 discloses a coagulant/flocculant composition having at least a polyaluminum compound in an aqueous solution, magnesium and/or calcium, and a water-soluble polymeric flocculant. However, the prior art does not disclose a water treatment composition according to the present invention which gives superior flocculation properties with regard to suspended matter.

Consequently, there is a need to develop new water treatment compositions, including flocculants that in combination are able to increase clarity in turbid water by rapidly forming flocs that are large, adherent, and resist re-dispersion upon agitation.

STATEMENT OF INVENTION

One aspect of the invention provides a water treatment composition comprising (a) an anionic flocculant comprising at least one of an alkali swellable emulsion (ASE) or hydrophobically-modified alkali swellable emulsion (HASE), and (b) a cationic flocculant comprising (i) an aluminum-containing compound, and (ii) a copolymer of acrylamide and a cationic monomer comprising at least one of a diallyldialkylammonium quaternary compound, acrylamidoalkyltrialkylammonium quaternary compound, methacrylamidoalkyltrialkylammonium quaternary compound, and mixtures thereof. In certain embodiments, the cationic monomer comprises diallyldimethylammonium chloride (DADMAC). In certain embodiments, the water treatment composition further comprises an anionic flocculant comprising an anionic polymer including, as polymerized units, one or more ethylenically unsaturated acid-containing monomers.

In another aspect, the invention provides a method for clarifying water comprising (a) adding a water treatment composition to water containing matter, wherein the water treatment composition comprises (i) an anionic flocculant comprising at least one of an alkali swellable emulsion (ASE) or hydrophobically-modified alkali swellable emulsion (HASE), and (ii) a cationic flocculant comprising (1) an aluminum-containing compound, and (2) a copolymer of acrylamide and a cationic monomer comprising at least one of a diallyldialkylammonium quaternary compound, acrylamidoalkyltrialkylammonium quaternary compound, methacrylamidoalkyltrialkylammonium quaternary compound, and mixtures thereof, (b) forming flocs in the water comprising the matter, and (c) removing the flocs from the water to remove the matter from the water. In certain embodiments, the cationic monomer comprises diallyldimethylammonium chloride (DADMAC). In certain embodiments, the water treatment composition further comprises an anionic flocculant comprising an anionic polymer including, as polymerized units, one or more ethylenically unsaturated acid-containing monomers.

DETAILED DESCRIPTION OF PREFERRED EMBODIMENTS

The inventors have surprisingly found that a combination of an alkali swellable emulsion (ASE) or hydrophobically-modified alkali swellable emulsion (HASE) with a cationic flocculant including an aluminum-containing compound and a copolymer of acrylamide and a cationic monomer provide excellent water treatment compositions that, when added to water containing undesired organic and inorganic matter, exhibit rapid formation of flocs that are large, adherent, and do not easily re-disperse if disturbed. Accordingly, the present invention provides compositions and methods that are useful for clarifying water, reducing turbidity of water, and removing salts from water.

As used herein, the term "acid-containing monomer" refers to ethylenically unsaturated monomers containing carboxylic acid, phosphonic acid, phosphinic acid, sulfinic acid, and sulfonic acid groups. Suitable acid-containing monomers include, for example, (meth)acrylic acid, maleic acid, succinic acid, itaconic acid, vinyl phosphonic acid, and vinylsulfonic acid. The term "(meth)acrylic" refers to either acrylic or methacrylic acid and the corresponding derivatives, such as esters or amides.

As used herein, the term "salts" refers to the ionic salt resulting from the reaction of a carboxylic acid, phosphonic acid, and sulfonic group (—C(O)OH, —P(O)OH, —S(O)OH) with a base. Suitable bases include, for example, alkali metal, alkali earth metal, metal and quaternary ammonium hydroxides, carbonates and bicarbonates, ammonia, and primary, secondary, and tertiary organic amines. Representative alkali, alkaline earth and metal salts include lithium, sodium, potassium, calcium, magnesium and zinc. Suitable amines include, for example, methylamine, ethylamine, ethoxylated amines, diethylamine, triethylamine, pyridine, piperdine, ethanolamine, piperazine, aminoethylpropanol, ethanolamine, diethanolamine triethanolamine. The term "salts" also refers to the ionic salt resulting from reaction of an amine (—NH$_2$), including amides (—CONH$_2$), with an acid. Suitable acids include, for example, hydrochloric acid, phosphoric acid, phosphonic acids acetic acid, (meth)acrylic acid, citric acid, sulfonic acids and sulfuric acid.

As used herein, the term "copolymer" refers to polymer compositions containing units of two or more different monomers, the term "terpolymer" refers to polymer compositions containing units of three or more different monomers, and the term "tetrapolymer" refers to polymer compositions containing units of four or more different monomers. A plurality of suitable monomer units is usefully employed in accordance with the invention. "Monomer" refers to any ethylenically unsaturated group, including polyethylenically unsaturated groups of a compound including allylic, vinylic, and acrylic groups. The monomer may be anionic, cationic or non-ionic.

All percentages referred to will be expressed in weight percent (%), based on total weight of polymer or composition involved, unless specified otherwise. The following abbreviations are used herein: g=grams; ppm=parts per million by weight/volume. Unless otherwise specified, ranges listed are to be read as inclusive and combinable and temperatures are in degrees centigrade (° C.).

As noted above, the water treatment compositions of the present invention comprise (a) an anionic flocculant comprising at least one of an alkali swellable emulsion (ASE) or hydrophobically-modified alkali swellable emulsion (HASE), and (b) a cationic flocculant comprising (i) an aluminum-containing compound, and (ii) a copolymer of acrylamide and a cationic monomer comprising at least one of a diallyldialkylammonium quaternary compound, acrylamidoalkyltrialkylammonium quaternary compound, methacrylamidoalkyltrialkylammonium quaternary compound, and mixtures thereof. In certain embodiments, the cationic monomer comprises diallyldimethylammonium chloride (DADMAC). In certain embodiments, the water treatment composition further comprises an anionic polymer including, as polymerized units, one or more ethylenically unsaturated acid-containing monomers.

The anionic flocculant contains an alkali swellable emulsion (ASE) or hydrophobically-modified alkali swellable emulsion (HASE). The alkali swellable emulsions (ASE) useful herein may be characterized as stable and uniform dispersions of polymer particles in water, wherein the polymer is capable of incorporating a quantity of water when in an alkaline medium such that there is formation of a gel and therefore an increase of viscosity. In certain embodiments, the ASE copolymer contains, as polymerized units, one or more ethylenically unsaturated acids or diacids including, for example, (meth)acrylic acid, and one or more acid-free polymerized units including, for example, (meth)acrylate esters, vinyl esters of carboxylic acids, or mixtures thereof. In certain embodiments, the ASE is a hydrophobically-modified alkali swellable emulsion (HASE) wherein the polymerized units of the copolymer have hydrophobic groups.

In certain embodiments, the ASE or HASE copolymers are cross-linked via a cross-linking agent to provide a polymer having a network structure. In such embodiments, the copolymers include a small amount (0.01 to 5 weight %) of at least one polyethylenically unsaturated monomer. Suitable examples include allyl methacrylate (ALMA), ethylene glycol dimethacrylate (EGDMA), butylene glycol dimethacrylate (BGDMA), diallyl phthalate (DAP), methylenebisacrylamide, pentaerythritol di-, tri- and tetra-acrylates, divinyl benzene, polyethylene glycol diacrylates, bisphenol A diacrylates, and combinations thereof. Other suitable cross-linking monomers include glycidyl methacrylate GMA, N-methylol acrylamide MOA, and 2-(acetoacetoxy)ethyl methacrylate AAEM. Low levels of the polyethylenically unsaturated monomers are preferred, since levels greater than about 5% by weight tend to over cross-link the polymer or provide a polymer network structure such that their effectiveness in the invention markedly decreases.

In certain embodiments, the anionic flocculant comprises an ASE copolymer comprising polymerized units of ethyl acrylate and methacrylic acid. In certain embodiments, the units of ethyl acrylate and methacrylic acid are present in a ratio of from 10:90 to 90:10, preferably from 20:80 to 80:20, and more preferably from 25:75 to 75:25.

In certain embodiments, the ASE or HASE has a particle size of from 10 nm to 10 microns, preferably 25 nm to 5 microns, and more preferably from 50 nm to 1 micron. In certain embodiments, the water treatment composition will contain the ASE or HASE in an amount such that the dosage range of the ASE or HASE is from 1 to 500 ppm, preferably from 2 to 200 ppm, and more preferably from 5 to 100 ppm.

As noted above, the cationic flocculant comprises an aluminum-containing compound. Suitable aluminum-containing compounds include, for example, polyaluminum chloride, aluminum chloride, polyaluminum chlorohydrate, aluminum sulfate, sodium aluminate, polyaluminum sulfate, polyaluminum silicate chloride, polyaluminum silicate sulfate, polyaluminum sulfate chloride, polyaluminum ferrisulfate, polyaluminum ferrisulfate chloride, polyaluminum ferrichloride, and mixtures thereof. In certain preferred embodiments, the aluminum-containing compound is a polyaluminum compound, preferably polyaluminum chloride. In certain embodiments, the polyaluminum chloride has the formula $Al_n(OH)_mCl_{(3-n-m)}$, wherein 0<m≤3n, and n≥1. Aluminum chlorohydrate is the name of the polyaluminum chloride where n=2 and m=5. In certain embodiments, aluminum chlorohydrate has the formula $Al_2Cl(OH)_5$. In certain embodiments, the polyaluminum chloride may have sulfate, which may also be referred to as polyaluminum chlorosulfate, and have the formula $Al_nOH_m(SO_4)_kCl_{(3n-m-k)}$. In certain embodiments, the water treatment composition will contain the aluminum-containing compound in an amount such that the dosage range of the aluminum-containing compound is from 1 to 500 ppm, preferably from 2 to 200 ppm, and more preferably from 5 to 100 ppm.

The cationic flocculant also contains a copolymer of a non-ionic monomer and a cationic monomer. "Non-ionic monomer" refers to a monomer as defined herein which is electrically neutral. Representative non-ionic, water-soluble monomers include, for example, acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, t-butylacrylamide, N-methylolacrylamide, alkyl(meth)acrylates such as methyl(meth)acrylate, butyl acrylate and ethylacrylate, vinyl monomers such as ethylene, styrene, divinylbenzene, di-isobutylethylene, vinyl acetate, and N-vinyl pyrrolidone, and allyl monomers such as allyl(meth)acrylate. In certain embodiments, the non-ionic monomer comprises acrylamide. "Cationic monomer" refers to a monomer as defined herein which possesses a net positive charge below a certain pH value. Representative cationic, water-soluble monomers include, for example, quaternary ammonium salts of amine functionalized monomers such as acrylamide, methacrylamide, N,N-dimethylacrylamide, N,N-diethylacrylamide, N-isopropylacrylamide, N-vinylformamide, N-vinylmethylacetamide, N-vinyl pyrrolidone, t-butylacrylamide, N-methylolacrylamide, tributylammonium ethyl(meth)acrylate (TBAEMA), N,N-dimethylaminoethyl methacrylate (DMAEMA), N,N-dimethylaminopropyl methacrylamide (DMAPMAM), diallyldimethylammonium chloride (DADMAC), methylacrylamidopropyltrimethylammonium chloride (MAPTAC), acrylamidopropyltrimethylammonium chloride (APTAC), N-vinyl pyrrolidone, polyquaternium-11 and polyquaternium-4. In certain embodiments, the cationic monomer comprises at least one diallylaidalkylammonium quaternary compound, acryamidoalkyltrialkylammonium quaternary compound, methacrylamidoalkyltrialkylammonium quaternary compound, and mixtures thereof. In certain preferred embodiments, the cationic monomer comprises DADMAC. In certain preferred embodiments the non-ionic monomer comprises acrylamide and the cationic monomer comprises DADMAC.

In certain embodiments, the cationic flocculant copolymer has a weight average molecular weight ($M_W$) of from 50,000 to 10,000,000, preferably from 100,000 to 5,000,000, and more preferably from 200,000 to 2,000,000. In certain embodiments, the water treatment composition will contain the cationic flocculant copolymer in an amount such that the dosage range of the copolymer is from 1 to 500 ppm, preferably from 2 to 200 ppm, and more preferably from 5 to 100 ppm.

As noted above, in certain embodiments the water treatment composition further comprises an anionic polymer including, as polymerized units, one or more ethylenically unsaturated acid-containing monomers. Suitable acid-containing ethylenically unsaturated monomers include, for example, ethylenically unsaturated ($C_3$-$C_6$) monocarboxylic acid monomers and ethylenically unsaturated ($C_3$-$C_6$) dicarboxylic acid monomers. Suitable ethylenically unsaturated ($C_3$-$C_6$) monocarboxylic acid monomers include, for example, acrylic acid (AA), methacrylic acid (MAA), $\alpha$-ethacrylic acid, $\beta,\beta$-dimethylacrylic acid, vinylacetic acid, allylacetic acid, ethylidineacetic acid, propylidineacetic acid, crotonic acid, and alkali and metal salts thereof. Suitable ethylenically unsaturated ($C_3$-$C_6$) dicarboxylic acid monomers include, for example, maleic acid, maleic anhydride, fumaric acid, itaconic acid, citraconic acid, mesaconic acid, methylenemalonic acid, and alkali and metal salts thereof. According to one embodiment, the ethylenically unsaturated ($C_3$-$C_6$) carboxylic acid monomers are selected from one or more of acrylic acid and methacrylic acid. Other suitable ethylenically unsaturated acid-containing monomers include 2-methyl-2-propene-1-sulfonic acid, styrene sulfonic acid, vinyl-sulfonic acid, allylsulfonic acid, methallylsulfonic acid, allyloxybenzenesulfonic acid, methallyloxybenzenesulfonic acid, vinyl phosphonic acid and styrene phosphonic acid. In certain embodiments, the anionic polymer comprises at least one of sodium polyacrylate and sodium polymethacrylate, preferably sodium polyacrylate. In certain embodiments, the cationic flocculant copolymer has a weight average molecular weight ($M_W$) of from 2,000 to 5,000,000, preferably from 20,000 to 1,000,000, and more preferably from 50,000 to 500,000. In certain embodiments, the water treatment composition will contain the anionic polymer in an amount such that the dosage range of the anionic polymer is from 1 to 500 ppm, preferably from 2 to 200 ppm, and more preferably from 5 to 100 ppm.

Polymerization methods for use in this invention include conventional emulsion polymerization and conventional solution polymerization techniques known in the art. Suitable polymerization processes typically are conducted in an aqueous reaction mixture, which contains at least one monomer and various synthesis adjuvants such as the free radical sources, buffers, and reductants in an aqueous reaction medium. Both batch and continuous processes can be used.

The amount of the inventive water treatment compositions to be administered to a given source of water depends on a number of factors including, for example, the concentration and amount of matter present in the water that one desires to remove. By way of non-limiting example, the water treatment composition will contain the flocculants in an amount such that the dosage range of all flocculants together is from 1 to 1,000 ppm, preferably 2 to 500 ppm, and more preferably 5 to 200 ppm.

The compositions of the present invention are highly effective flocculants for the treatment of water, and that, when added to water containing undesired organic and inorganic matter, exhibit rapid formation of flocs that are large, adherent, and do not easily re-disperse if disturbed. Thus, for instance, the water treatment compositions of the present invention may be used in a method for chemically treating raw water to decrease turbidity and achieve clarification. The inventive water treatment compositions significantly improve liquid-solid separation processes that presently exist in the market. The invention is also directed towards the removal of undesired organic and inorganic matter from water. Accordingly, one aspect of the invention provides a method for clarifying water comprising (a) adding the inventive water treatment composition described herein to water containing matter, (b) forming flocs in the water comprising the matter, and (c) removing the flocs from the water to remove the matter from the water.

In practicing the methods of the invention, the water treatment compositions are generally administered by adding the composition to water and gently stirring to assist mixing of the flocculants. The flocculants may be added sequentially or simultaneously. A person of ordinary skill in the art can readily determine the frequency with which the water treatment composition should be applied to a given source of water. The frequency may depend, for example, on the amount of undesired matter that may be introduced to the water over time in a given day.

Some embodiments of the invention will now be described in detail in the following Examples.

EXAMPLES

Example 1

Exemplary Water Treatment Compositions

Exemplary water treatment compositions of the present invention contain the components recited in Table 1.

TABLE 1

Exemplary Water Treatment Compositions

| Reagent (ppm) | E1 | E2 | E3 | E4 | E5 | E6 | E7 | E8 | E9 |
|---|---|---|---|---|---|---|---|---|---|
| PAC | 100 | 100 | 100 | 50 | 100 | 100 | 100 | 100 | 100 |
| PQ-7 | 100 | 100 | 100 | 50 | 50 | 25 | 100 | 100 | 100 |
| R7000 | 100 | 100 | 100 | 100 | 100 | 100 | 100 | 100 | 100 |
| Acumer 1510 | — | — | — | — | — | — | 100 | 50 | 25 |

PAC = Polyaluminum chloride
PQ-7 = Polyquaternium-7 (copolymer of acrylamide and diallyldimethylammonium chloride)
R7000 = Romax ™ 7000 (cross-linked anionic acrylic polymer emulsion)
Acumer ™ 1510 = (polyacrylic acid)

Each of the above inventive example compositions was added sequentially or simultaneously to a test solution under varying conditions and evaluated for various flocculant properties as described in the following examples.

Example 2

Comparative Water Treatment Compositions

Comparative water treatment compositions contain the components recited in Table 2.

TABLE 2

Comparative Water Treatment Compositions

| Reagent (ppm) | C1 | C2 | C3 | C4 | C5 | C6 | C7 | C8 | C9 | C10 |
|---|---|---|---|---|---|---|---|---|---|---|
| PAC | 100 | 100 | — | 100 | 100 | 100 | 100 | 100 | 100 | — |
| PQ-7 | — | — | 100 | — | — | — | — | — | — | 100 |
| R7000 | 100 | 100 | 100 | 100 | 100 | 100 | 100 | 100 | — | — |
| Acumer 1510 | — | — | — | — | — | — | — | 100 | 100 | 100 |
| Softcat SX-1300H | — | 100 | — | — | — | — | — | — | — | — |
| Ecosmooth 100 | — | — | — | 100 | — | — | — | — | — | — |
| Polyox WSR301 | — | — | — | — | 100 | — | — | — | — | — |
| Acusol 880 | — | — | — | — | — | 100 | — | — | — | — |
| UCARE JR400 | — | — | — | — | — | — | 100 | — | — | — |

PAC = Polyaluminum chloride
PQ-7 = Polyquaternium-7 (copolymer of acrylamide and diallyldimethylammonium chloride)
PQ-7 = Polyquaternium-7 (copolymer of acrylamide and diallyldimethylammonium chloride)
R7000 = Romax™ 7000 (cross-linked anionic acrylic polymer emulsion)
Acumer™ 1510 = (polyacrylic acid)
SoftCAT™ SX1300H = Polyquaternium 67 (quaternized hydroxyethyl cellulose derivatives with cationic substitution of trimethyl ammonium and dimethyl dodecyl ammonium)
ECOSMOOTH™ 100 = Guar gum, 2-hydroxy-3-(trimethylammoniu)propyl ether, chloride
POLYOX™ WSR301 = Polyethylene oxide
Acusol™ 880 = PEG-150/decanol/DES-W
UCARE™ JR400 = Polyquaternium-10 (quaternized hydroxyethyl cellulose)

Each of the above inventive example compositions was added sequentially or simultaneously to a test solution under varying conditions and evaluated for various flocculant properties as described in the following examples.

Example 3

Efficacy of Water Treatment Compositions

The efficacy of inventive and comparative water treatment compositions as prepared in Examples 1 and 2 above were evaluated for various flocculant properties after administration to test water containing various salts that imparted turbidity. The test water was prepared by the addition of various salts to deionized water, the components of which are described in Table 3.

TABLE 3

Sample Test Water Composition

| Components | Concentration (ppm) |
|---|---|
| Calcium chloride dihydrate | 392 |
| Magnesium chloride hexahydrate | 173 |
| Magnesium sulfate heptahydrate | 118 |
| Sodium sulfate | 80 |
| Sodium bicarbonate | 347 |
| Iron sulfate | 3 |
| Humic acid | 2 |
| A2 Fine dust (a standard ISO 12103-1 product) | 280 |

After addition of the salts, the test water was equilibrated to a pH of about 8. The test water appeared turbid and exhibited a light transmittance of about 23% at 460 nm. The test water was continuously stirred at 500 rpm to provide vigorous agitation so that the salts did not settle.

A specified quantity of the above test water was transferred to a glass beaker and stirred with a magnetic stirrer at 120 rpm. The various anionic and cationic flocculants of the inventive and comparative compositions described in Examples 1 and 2 above were added sequentially or simultaneously and mixed for 1.5 minutes with the magnetic stirrer at 120 rpm. The sample was then stirred for an additional 1.5 minutes, and the allowed to settle for another 1.5 minutes before being observed for floc formation (yes/no), qualitative nature/tightness of the flocs (very firm/firm/loose), and % transmittance of the supernatant water (at 460 nm). The flocs were then re-disturbed by gently stirring the sample with a spatula three times, and the time required for the flocs to resettle was observed. The results for each of these four evaluations are reported in Table 4.

TABLE 4

Effectiveness of Inventive and Comparative Water Treatment Compositions

| Example No. | % Transmittance (@460 nm) | Floc Formation after 1.5 mins | Nature of Floc | Time to Resettle After Disturbance (secs) | Process (order of addition) |
|---|---|---|---|---|---|
| E1 | 72.7 | Yes | Firm | ~20 | Dirty water + (PAC + PQ7). Stir at 120 rpm for 45 s. Add R7000. Stir 45 s. Stop stirring & wait 1.5 mins |

TABLE 4-continued

Effectiveness of Inventive and Comparative Water Treatment Compositions

| Example No. | % Transmittance (@460 nm) | Floc Formation after 1.5 mins | Nature of Floc | Time to Resettle After Disturbance (secs) | Process (order of addition) |
|---|---|---|---|---|---|
| E2 | 72.7 | Yes | Firm | ~60 | Dirty water + PAC. Stir at 120 rpm for 45 s. Add R7000. Stir 45 s. Add PQ 7 and stir for 45 s. Stop stirring & wait 1.5 mins |
| E3 | 81.6 | Yes | Firm | ~30 | Dirty water + (PAC + PQ7) + R7000 – all 3 added together. Stir at 120 rpm for 90 s. Stop stirring & wait 1.5 mins |
| E4 | 63.1 | Yes | Firm | ~40 | Dirty water + (PAC + PQ7). Stir at 120 rpm for 45 s. Add R7000. Stir 45 s. Stop stirring & wait 1.5 mins |
| E5 | 79.1 | Yes | Firm | ~20 | Dirty water + (PAC + PQ7). Stir at 120 rpm for 45 s. Add R7000. Stir 45 s. Stop stirring & wait 1.5 mins |
| E6 | 84.1 | Yes | Firm | ~40 | Dirty water + (PAC + PQ7). Stir at 120 rpm for 45 s. Add R7000. Stir 45 s. Stop stirring & wait 1.5 mins |
| E7 | 69.0 | Yes | Very Firm | ~10 | Dirty water + (PAC + PQ7). Stir at 120 rpm for 45 s. Add (R7000 + Ac1510). Stir 45 s. Stop stirring & wait 1.5 mins |
| E8 | 75.8 | Yes | Very Firm | ~10 | Dirty water + (PAC + PQ7). Stir at 120 rpm for 45 s. Add (R7000 + Ac1510). Stir 45 s. Stop stirring & wait 1.5 mins |
| E9 | 73.5 | Yes | Very Firm | ~13 | Dirty water + (PAC + PQ7). Stir at 120 rpm for 45 s. Add (R7000 + Ac1510). Stir 45 s. Stop stirring & wait 1.5 mins |
| C1 | 84.1 | Yes | Loose | >100 | Dirty water + PAC. Stir at 120 rpm for 45 s. Add R7000. Stir 45 s. Stop stirring & wait 1.5 mins |
| C2 | 50.6 | No | — | — | Dirty water + (PAC + Softcat). Stir at 120 rpm for 45 s. Add R7000. Stir 45 s. Stop stirring & wait 1.5 mins |
| C3 | 33.6 | No | — | — | Dirty water + PQ7. Stir at 120 rpm for 45 s. Add R7000. Stir 45 s. Stop stirring & wait 1.5 mins |
| C4 | 27.8 | No | — | — | Dirty water + (PAC + Ecosmooth). Stir at 120 rpm for 45 s. Add R7000. Stir 45 s. Stop stirring & wait 1.5 mins |
| C5 | 74.3 | Yes | Loose | >100 | Dirty water + (PAC + Polyox). Stir at 120 rpm for 45 s. Add R7000. Stir 45 s. Stop stirring & wait 1.5 mins |
| C6 | 87.7 | Yes | Loose | >100 | Dirty water + (PAC + Ac880). Stir at 120 rpm for 45 s. Add R7000. Stir 45 s. Stop stirring & wait 1.5 mins |
| C7 | 43.4 | No | — | — | Dirty water + (PAC + Ucare). Stir at 120 rpm for 45 s. Add R7000. Stir 45 s. Stop stirring & wait 1.5 mins |

TABLE 4-continued

Effectiveness of Inventive and Comparative Water Treatment Compositions

| Example No. | % Transmittance (@460 nm) | Floc Formation after 1.5 mins | Nature of Floc | Time to Resettle After Disturbance (secs) | Process (order of addition) |
|---|---|---|---|---|---|
| C8 | 73.4 | Yes | Loose | >45 | Dirty water + PAC. Stir at 120 rpm for 45 s. Add (R7000 + Ac1510). Stir 45 s. Stop stirring & wait 1.5 mins |
| C9 | 75.0 | Yes | Loose | >60 | Dirty water + PAC + Ac1510. Stir at 120 rpm for 1.5 mins. Stop stirring & wait 1.5 mins |
| C10 | 50.0 | No | — | — | Dirty water + PQ7 + Ac1510. Stir at 120 rpm for 1.5 mins. Stop stirring & wait 1.5 mins |

The above results demonstrate that the inventive compositions provide superior performance as compared with non-inventive compositions when evaluated for rapid formation of flocs that are large, adherent, and do not easily re-disperse if disturbed.

What is claimed is:

1. A water treatment composition comprising:
   (a) an anionic flocculant comprising at least one of an alkali swellable emulsion (ASE); and
   (b) a cationic flocculant comprising (i) an aluminum-containing compound, and (ii) a copolymer of acrylamide and a cationic monomer comprising at least one of a diallyldialkylammonium quaternary compound, acrylamidoalkyltrialkylammonium quaternary compound, methacrylamidoalkyltrialkylammonium quaternary compound, and mixtures thereof;
   wherein the at least one alkali swellable emulsion (ASE) comprises an ASE copolymer comprising polymerized units of ethyl acrylate and methacrylic acid; wherein the ASE copolymer further comprises 0.01 to 5 wt % of at least one polyethylenically unsaturated monomer; and wherein the aluminum-containing compound is polyaluminum chloride.

2. The water treatment composition of claim 1, wherein the cationic monomer comprises diallyldimethylammonium chloride (DADMAC).

3. The water treatment composition of claim 1, wherein the ASE copolymer comprises ethyl acrylate and methacrylic acid in a ratio of from 20:80 to 80:20.

4. The water treatment composition of claim 1 further comprising an anionic polymer including, as polymerized units, one or more ethylenically unsaturated acid-containing monomers.

5. The water treatment composition of claim 4, wherein the anionic polymer comprises sodium polyacrylate.

6. A method for clarifying water comprising:
   (a) adding a water treatment composition to water containing matter, wherein the water treatment composition comprises:
      (i) an anionic flocculant comprising at least one of an alkali swellable emulsion (ASE); and
      (ii) a cationic flocculant comprising (1) an aluminum-containing compound, and (2) a copolymer of acrylamide and a cationic monomer comprising at least one of a diallyldialkylammonium quaternary compound, acrylamidoalkyltrialkylammonium quaternary compound, methacrylamidoalkyltrialkylammonium quaternary compound, and mixtures thereof;
      wherein the at least one alkali swellable emulsion (ASE) comprises an ASE copolymer comprising polymerized units of ethyl acrylate and methacrylic acid; wherein the ASE copolymer further comprises 0.01 to 5 wt % of at least one polyethylenically unsaturated monomer; and wherein the aluminum-containing compound is polyaluminum chloride;
   (b) forming flocs in the water comprising the matter; and
   (c) removing the flocs from the water to remove the matter from the water.

7. The method of claim 6, wherein the water treatment composition further comprises sodium polyacrylate.

8. The method of claim 6, wherein the cationic monomer comprises diallyldimethylammonium chloride (DADMAC).

* * * * *